(12) United States Patent
Aykac et al.

(10) Patent No.: US 10,068,573 B1
(45) Date of Patent: Sep. 4, 2018

(54) APPROACHES FOR VOICE-ACTIVATED AUDIO COMMANDS

(71) Applicant: Amazon Technologies, Inc., Reno, NV (US)

(72) Inventors: Kaan Aykac, San Francisco, CA (US); Kintan Dilipkumar Brahmbhatt, San Francisco, CA (US); Matthew Mahar, San Francisco, CA (US); Rickesh Pal, San Francisco, CA (US); Daniel Paul Ryan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/386,972

(22) Filed: Dec. 21, 2016

(51) Int. Cl.
| | | |
|---|---|---|
| *G10L 15/22* | (2006.01) | |
| *G06F 17/27* | (2006.01) | |
| *G06F 3/16* | (2006.01) | |
| *G10L 15/26* | (2006.01) | |

(52) U.S. Cl.
CPC .............. *G10L 15/22* (2013.01); *G06F 3/165* (2013.01); *G06F 17/2775* (2013.01); *G10L 15/26* (2013.01); *G10L 2015/223* (2013.01)

(58) Field of Classification Search
CPC ....................................................... G10L 15/22
See application file for complete search history.

(56) References Cited

U.S. PATENT DOCUMENTS

| | | | |
|---|---|---|---|
| 8,521,766 B1 * | 8/2013 | Hoarty .............. | G06F 17/30023 704/251 |
| 9,431,021 B1 * | 8/2016 | Scalise ................... | G10L 21/00 |
| 2002/0087310 A1 * | 7/2002 | Lee ......................... | G06Q 30/06 704/251 |
| 2005/0131695 A1 * | 6/2005 | Lucente .................. | G10L 15/22 704/257 |
| 2009/0222442 A1 * | 9/2009 | Houh ................ | G06F 17/30247 |
| 2013/0006629 A1 * | 1/2013 | Honda .............. | G06F 17/30681 704/236 |
| 2013/0096925 A1 * | 4/2013 | Paik .................. | G06F 17/30769 704/275 |
| 2014/0037111 A1 * | 2/2014 | Uhle ........................ | H04R 3/00 381/119 |
| 2014/0039893 A1 * | 2/2014 | Weiner .................... | G06F 3/167 704/249 |
| 2014/0052452 A1 * | 2/2014 | Koivuniemi ..... | H04N 21/42203 704/275 |
| 2014/0129235 A1 * | 5/2014 | Suvanto .................. | G10L 15/22 704/276 |
| 2014/0200893 A1 * | 7/2014 | Vanjani ................. | G10L 15/183 704/257 |
| 2016/0155445 A1 * | 6/2016 | Selfridge ............ | G10L 15/1822 704/249 |
| 2016/0307568 A1 * | 10/2016 | Zhao ....................... | G10L 15/22 |
| 2017/0070783 A1 * | 3/2017 | Printz .................. | G11B 27/022 |
| 2017/0236512 A1 * | 8/2017 | Williams ................ | G10L 15/22 |

\* cited by examiner

*Primary Examiner* — Douglas Godbold

(74) *Attorney, Agent, or Firm* — Hogan Lovells US LLP

(57) ABSTRACT

Audio data is received, for example from a voice communications device, and using commands and contexts in the audio data, playback of a content item such as a song can be accomplished. For example, a user can skip ahead in a song, play a song, find a song, and otherwise perform control functions on a device with no screen that give the user contextual control over the song that is playing or is to be played.

20 Claims, 9 Drawing Sheets

APPROACHES FOR VOICE-ACTIVATED AUDIO COMMANDS

BACKGROUND

As electronic devices become increasingly sophisticated, people are using such devices in new and interesting ways. Some of these devices have adopted voice control where the device can perform various actions in response to a spoken question or instruction. For example, in response to a spoken question or instruction, these devices can analyze the voice data to determine an appropriate response. In some cases, these devices can play music or control other devices that play music; however, if the devices do not have a display screen, then the control functionality may be limited and only certain types of tasks may be capable of being performed.

BRIEF DESCRIPTION OF THE DRAWINGS

Various embodiments in accordance with the present disclosure will be described with reference to the drawings, in which.

DETAILED DESCRIPTION

Figure 1A:
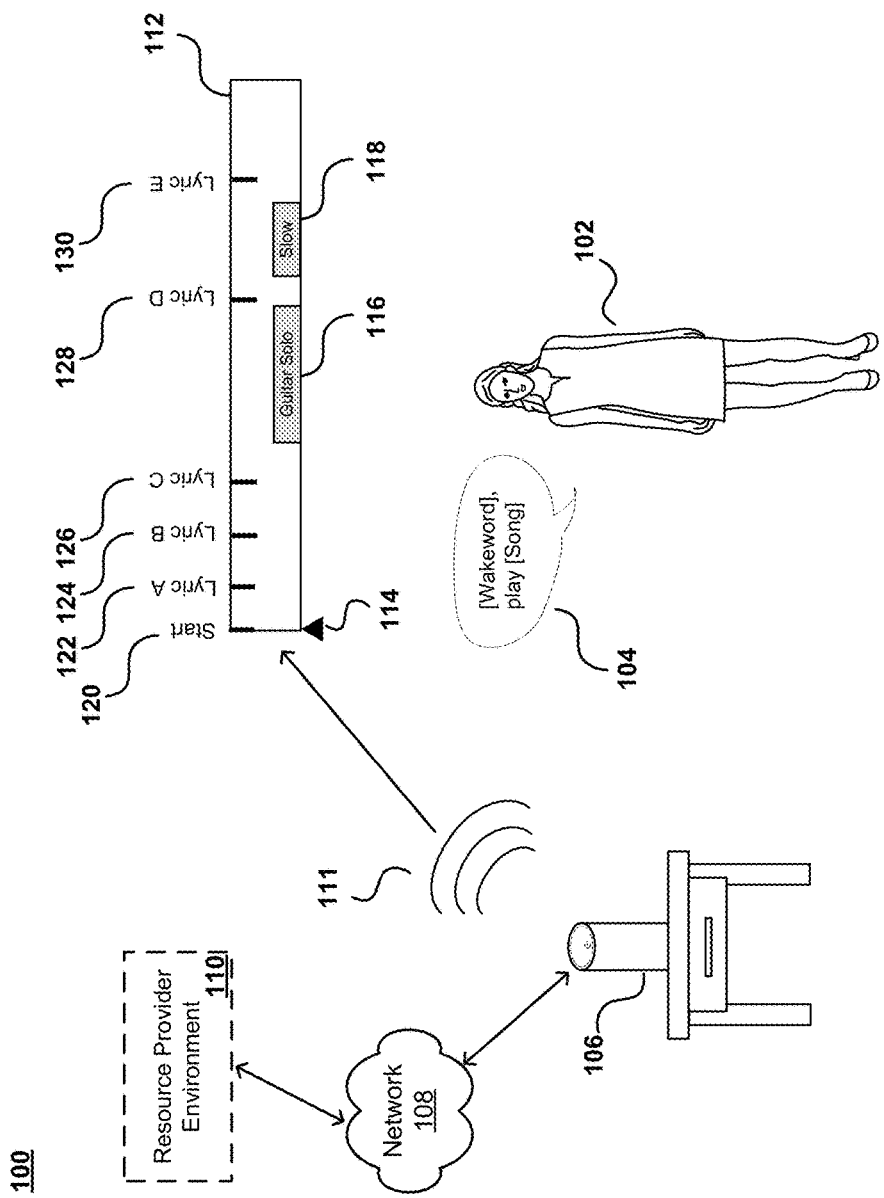
FIG. 1A illustrates an example situation 100 where a user is issuing a voice command to an audio playback device, in accordance with various embodiments.

Systems, devices and methods in accordance with various embodiments of the present disclosure may overcome one or more of the aforementioned and other deficiencies experienced in conventional approaches for utilizing audio commands to control content items. In particular, various embodiments enable intelligent and accurate interpretation and processing of audio commands related to the playing of songs and/or other types of audio data or content items.

For example, audio data captured by a voice communications device (e.g., a device with a microphone or capable of receiving audio data, such as in a digital file and/or over a network) can include a representation of an utterance spoken by a person within a detection range of a voice communications device. The audio data can be captured and analyzed to determine an audio control command (i.e., a control command received via audio) as well as a context (e.g., a command control context, an audio command control context, etc.). For example, the audio data may be analyzed to determine that a person said the word "play," which would be recognized as an audio command with a specific associated result to be generated at an audio device (e.g., play a song). The analysis may also indicate a command context for the audio command; for example, it may be determined that after the word "play," the audio data included a name of a song available for playing on an audio device (e.g., the voice communications device, a laptop communicably connected with the voice communications device, etc.). The word "play" would be recognized as the command and the song name would be recognized as the command context. While audio files and music are discussed herein as example implementations of the claimed approaches, those of skill in the art would recognize that the described techniques could also be used in various implementations where a display-less device is used to control the playing of content items (e.g., audio, video, games, virtual reality systems, etc.).

Once an audio command and a command context are determined, based at least in part on the determination, a song (or, as discussed above, another type of content item) in a music library (e.g., stored on the voice communications device and/or an audio playback device, available via a streaming music service, available on a website or other Internet resource, etc.) is determined and various song segment markers (which in various embodiments serve to indicate song segments; however, in alternate embodiments, song segment markers and song segments may be considered synonymous) in the song are determined, at least some of the song segment markers (or song segments) being associated with a song segment context and in some implementations may be further associated with a temporal location in the song (e.g., a timestamp, a time offset, a frame, etc.). For content items other than songs (e.g., video, etc.), it should be understood that the term "song segment," "song segment context," etc. are not intended to be limiting terms, and the nomenclature of a "video segment," "video segment context," etc., or other type of segment may be substituted for "song segment" without departing from the scope and intent of the claimed embodiments and the techniques described herein.

Once the audio command, the audio command context, and/or the song segment markers (or song segments) with their associated song segment contexts (and in some embodiments, the temporal locations) are determined, then a comparison may be made between the audio command context and the song segment contexts, for example in order to determine whether any of the song segment markers correspond to the audio command. For example, if the audio command is "go to" and the audio command context is "guitar solo," or other contexts as discussed herein, and one of the song segments is associated with a "guitar solo" context, then that particular song segment marker may be identified as a target song segment marker and an accompanying temporal location be identified as a target temporal location. Playback of the song may be started or otherwise modified in accordance with the audio command, such that the playback of the song includes the target temporal marker. In some embodiments, a song segment marker and/or a temporal location may not be used.

By allowing a user to have a voice command interpreted in light of previously-identified song segments, fine-grained intelligent control over content item playback may be enabled, even when no display screen is available, for example to select a particular song in a library, drag a "scrubber bar" or other user interface control to move through playback of the content item, etc. Previous approaches to voice control of content items only offer non-contextual control capabilities, such as playing a song from the beginning, skipping a song, etc.

Accordingly, approaches in accordance with various embodiments improve the operation and performance of computing devices, such as those on which they are implemented, by reducing the amount of hardware (e.g., allowing for the elimination of display screens, user input devices, etc. on devices that are capable of controlling content items), which frees up processor cycles, ports, and memory to perform other tasks, and providing for more precise and useful voice control of a content item or items without requiring a user to physically interact with an input device such as a mouse, trackpad, etc.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

FIG. 1A illustrates an example situation 100 where a user is issuing a voice command to an audio playback device, in accordance with various embodiments. Although a voice communications device 106 (e.g., an Amazon Echo) is illustrated, it should be understood that various other types of electronic devices that are capable of receiving audio input and/or controlling audio playback devices can be used as well in accordance with various embodiments. These devices can include, for example, notebook computers, ultrabooks, personal data assistants, video gaming consoles, televisions, set top boxes, smart televisions, portable media players, unmanned devices (e.g., drones or autonomous vehicles), wearable computers (e.g., smart watches, smart glasses, bracelets, etc.), display screens, display-less devices, virtual reality headsets, display-based devices, smart furniture, smart household devices, smart vehicles, smart transportation devices, and/or smart accessories, among others.

In the example 100 of FIG. 1A, a user 102 is issuing a voice command 104 can be received to a voice communications device 106 in accordance with various embodiments. In this example, a user 102 is generating an utterance 104, or otherwise speaking a voice command 104 that can be received by a voice communications device 106. The voice-enabled communications device 106 can include, for example, any device having a microphone or other component configured to generate audio data from received sound in the frequency range in which humans communicate. As will be described further herein, voice communications devices include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, the user 102 can speak a request within an environment where the voice communications device 106 is located. The request may be any question, inquiry, instruction, phrase, or other set of one or more words/sounds. For example, the user may say, "Wakeword, play "Sweet Child O' Mine." In this example, the word "Wakeword" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the voice communications device. Persons of ordinary skill in the art will recognize, however, that the one or more microphones may alternatively be located on a separate device in communication with the voice communications device. In some embodiments, after the wakeword is detected, the voice communications device 106 may begin interpreting/analyzing audio input data until no more speech is detected. In general, the voice communications device 106 constantly listens for the wakeword and is otherwise inactive. Once the wakeword is recognized, the voice communications device switches from a passive mode to an active mode. It should be noted that the wakeword does not have to be the first word or sound in a given sentence or request. The voice communications device 106 can be configured such that the device can record and store a limited amount of audio input data that should, in most instances, equal the amount of time needed to speak a sentence or more. Accordingly, even if a wakeword is recognized in the middle or end of a sentence, the voice communications device will have retained the entire sentence, which can then be analyzed by backend servers to determine what is being requested. In this example, the voice communications device 106 will detect the wakeword in the utterance 104 and cause an amount of audio data to be recorded, that can then be analyzed on the device or, in at least some embodiments, uploaded to a speech processing service for analysis.

In this example, the audio data comprising the utterance is received by voice communications device 106. As discussed further herein, in addition to the wakeword, the audio data may further comprise an audio control command (e.g., "play") and an associated audio command control context (or command context) such as "[Song]," where [Song] is a song title; however, as discussed herein, audio commands and their associated contexts are not limited to this particular example. The audio data is sent over a network 108 (e.g., the Internet) to a destination such as a resource provider environment 110 (e.g., a cloud computing environment). As discussed further herein, resource provider environment 110 may comprise various servers, virtual machines, services, applications, and/or processes such as those related to automatic speech recognition, natural language understanding, text-to-speech functionality, and other applications. In addition, in various embodiments resource provider environment 110 may also comprise a music listening service (e.g., an online music subscription service, an online radio station, etc.) or be in communication with a music listening service such that audio control commands and/or command contexts may be performed on music stored at or available to the music listening service. In other embodiments, music may be stored at or available to voice communications device 106 or an audio playback device that is capable of receiving and acting on commands sent to it by voice communications device 106.

In the example of FIG. 1A, user 102 has issued an audio control command to play a song, and the command context is the title of the song. In response, a song 112 matching the title is located, for example at the music listening service (not pictured). According to an embodiment, the song 112 is associated with data comprising one or more song segment markers 116-130, although as discussed above, the song segment markers may comprise or denote song segments. In the example of FIG. 1A, there are several song segments/song segment markers associated with the song that have associated contexts. There is a song segment marker with a context of a guitar solo 116, a song segment marker with a context of a slow tempo section 118, a song segment marker with a context of the beginning of the song 120, a song segment marker with a context of a lyric A 122 (which in various embodiments may comprises a single word of a lyric or may indicate the beginning of a "lyric line," the difference between which may be thought of as the difference between "Happy" and "Happy Birthday to you," for example), a song segment marker with a context of a lyric B 124, a song segment marker with a context of a lyric C 126, a song segment marker with a context of a lyric D 128, and a song segment marker with a context of a lyric E 130. As discussed herein, any number of song segments/song segment markers and associated song segment contexts may be included in data associated with the song 112 (e.g., metadata associated with an audio file of a song).

In an embodiment, in response to determining from the utterance 104 that the audio command is to play, and the audio command context is to play the song from the beginning, a comparison is made between the audio command context (e.g., start, beginning, etc.) and the song segment contexts 116-130 in order to determine a match or best fit. In this example, the song segment context of "start" associated with a song segment/song segment marker 120 at the beginning of the song is determined to match the audio command context. In response, the song begins playing 111 (e.g., at the voice communications device 106) from the beginning of the song (as indicated by the "thumb" 114). In various embodiments, the song segment marker for the start of the song 120 may also be associated with a temporal location (e.g., a timestamp, an offset value, etc.) that is used to determine where playback would begin, if playback is to include the temporal location (such as starting at the temporal location). In some embodiments, the temporal location may comprise a time range corresponding to the song segment (or the song segment marker, depending on the embodiment). For example, the "guitar solo" song segment 116 may last for 30 seconds in the song, from a timestamp of 2:00 minutes to a timestamp of 2:30 minutes. If playback is to include the temporal location, that may comprise starting at 2:00 and stopping at 2:30, or simply starting at 2:00 and playing from that point, etc.

Figure 1B:
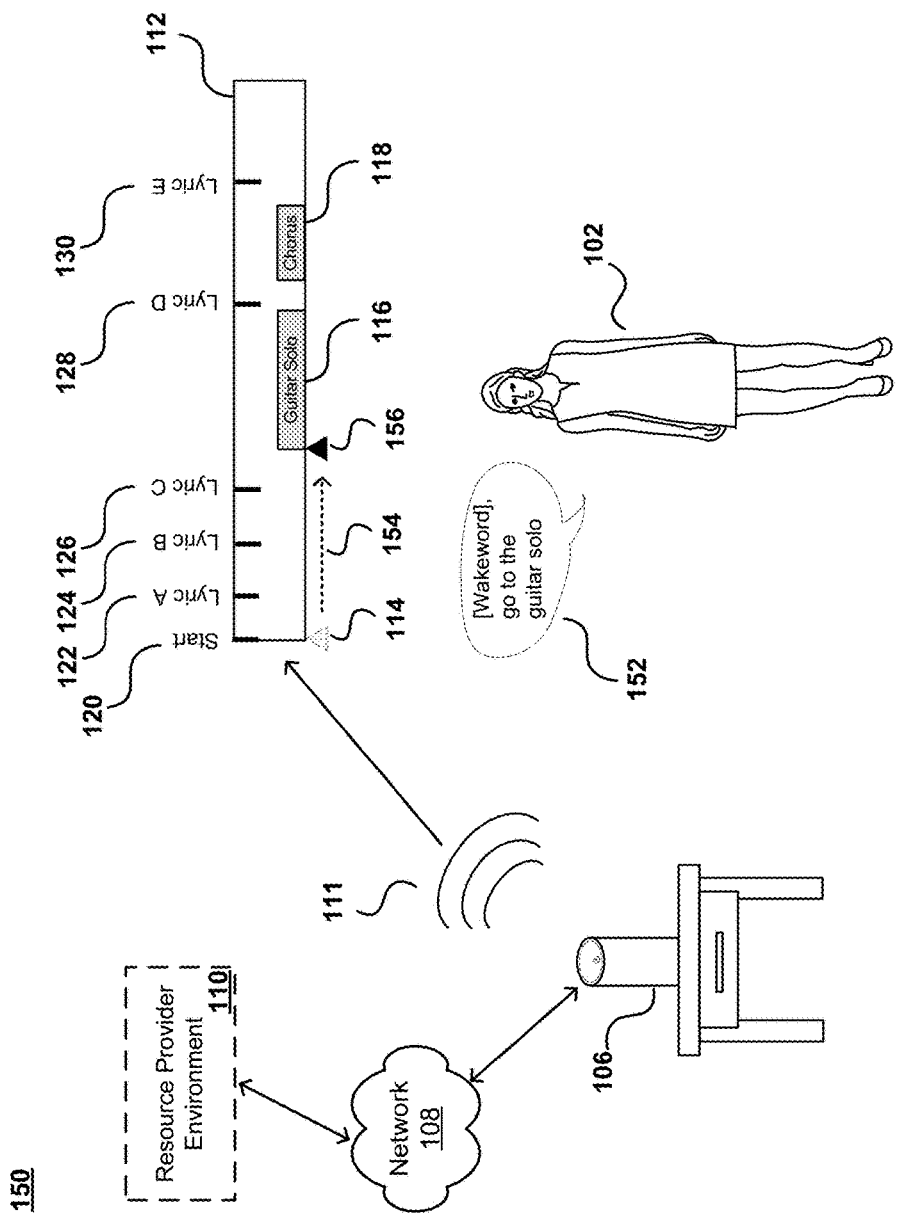
FIG. 1B illustrates an example situation 150 where a user is issuing a subsequent voice command to an audio playback device, in accordance with various embodiments.

FIG. 1B illustrates an example situation 150 where a user is issuing a subsequent voice command to an audio playback device, in accordance with various embodiments. It should be understood that reference numbers may be carried over between figures for similar components for purposes of explanation, but that such use should not be interpreted as a limitation on the various embodiments. In this example, the song 112 is playing 111 from the beginning, as illustrated in FIG. 1A, but the user 102 issues a subsequent voice command 152 to "go to the guitar solo." Upon recognition of the audio command ("go to") and the context ("guitar solo"), a comparison is made between the context ("guitar solo") and the song segment contexts associated with the song segments/song segment markers 116-130. Upon determination that the song segment context of "guitar solo" 116 matches the command context, then playback 111 of the song 112 is modified such that the playing moves to the song segment/song segment marker/temporal location associated with the guitar solo 116 context (as indicated by the movement 154 and new position 156 of the "thumb" 114).

Figure 2:
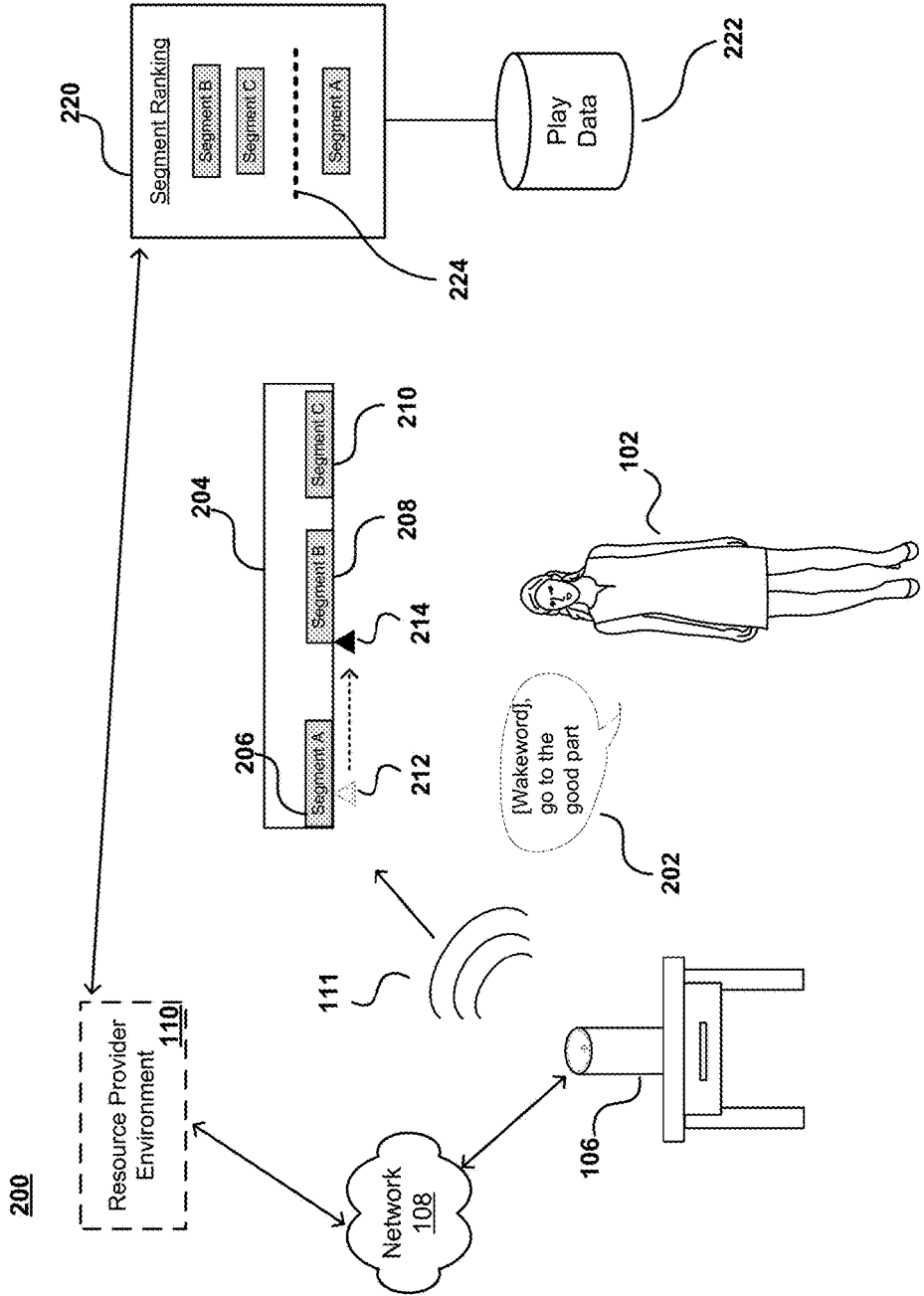
FIG. 2 illustrates an example situation 200 of determining a song segment context corresponding to an audio command context, in accordance with various embodiments.

FIG. 2 illustrates an example situation 200 of determining a song segment context corresponding to an audio command context, in accordance with various embodiments. In the example 200 of FIG. 2, the user 102 is playing 111 a song 204 on the voice communications device 106 (or another device). The song 204 is partially started, as reflected by the position of the scrubber 212. The user 102 issues an utterance 202 that, once it is processed, for example at the resource provider environment 110, is determined to have an audio command of "go to" and an audio command context of "the good part." The song 204 is associated with several song segments/song segment markers 206, 208, 210 with associated contexts. According to the example of FIG. 2, in order to determine a song segment context corresponding to the audio command context ("the good part"), a segment ranking 220 may be utilized. For example, the segment ranking may be stored at, or accessible by resource provider environment 110.

In the example of FIG. 2, the segment ranking 220 of the song segment contexts 208-212 may be determined based on various data, such as may be stored in data store 222. For example, a particular segment in the song may have been determined, and actions related to the segment may be tracked and stored. For example, each segment may have data indicating a popularity of the segment. This may include, for example, data indicating how often the particular song segment has been played, such as by the user 102, or by a larger selection of people, such as customers of a music listening service. For example, the most played seconds or segments of the song. Additional data used to determine popularity, for example, may be skip data associated with the song segment. This may take the form of how many times a user (or a set of users) has skipped in the song directly after the segment, during the segment, or before the segment. A user skipping during the segment may indicate that it is not popular, which would tend to indicate that the portion of the song containing the song segment is not popular, while a user skipping directly after a song segment may tend to indicate that the segment was a "good part" (i.e., popular), such that the user is not interested in the rest of the song after hearing that part. Other conclusions may be drawn in order to rank the segments such that the associated segment contexts are responsive to a comparison with the command context (e.g., a user asking for a "good part" is implicitly asking for a popular part). In some examples, a song segment's measure(s) of popularity (or other data) may need to be normalized prior to or as part of a ranking process. For example, a song segment at the beginning a song may inherently be more "popular" (e.g., played more often), and therefore the popularity or other measure (e.g., such as a score, ranking value, etc.) should be normalized to make its value more representative of the song segment's actual popularity or other measure.

Additional measures and/or data may be utilized, such as to perform a ranking of potential song segment markers. For example, a determination that song volume has increased or decreased during playback of the particular song segment may be indicative of popularity or other measure, as would a listener repeating the segment. An amount of times the song segment has been shared on social media and/or other websites and Internet services may be utilized. A number of times or a popularity associated with the song segment being "sampled" in other musical works may be utilized. The use of the song segment, or a portion thereof, in the "song sample" at online music stores (e.g., a thirty-second preview available to potential purchasers of the song) may be utilized.

As discussed previously, the potential song segments in the ranking 220 may have an associated score or ranking value. This may be determined, for example, by classifier data or other approaches. Certain segments may fall above or below a threshold value 224, and as a result may be included or excluded from a candidate set of song segments, such as may be the case in an embodiment where a multi-stage evaluation process is performed to find a best match for an audio command context. In an embodiment, 224 may indicate a threshold below which song segments that have been affirmatively or implicitly determined to be non-responsive to the audio command/audio command context would fall. For example, if Song Segment A 206 is currently playing, and the audio command is "skip ahead to . . . ," then it may be determined in some cases that Segment A 206 cannot be responsive to that command, as the user wants to skip ahead from the currently-playing segment (Segment A 206). For example, a song segment context to match the audio command context may be selected based on the ranking value. In the example of FIG. 2, "Segment B" is indicated in the segment ranking 220 as the highest-ranked, and therefore potential best fit for the audio command context ("the good part"). Therefore, playback 111 of the song 204 is modified such that the song 204 continues at the song segment/song segment marker 208 associated with song segment B and its associated context. This may be seen in FIG. 2 by the "thumb" 214 moving from its original position 212. In some embodiments, human curation or other types of overrides may be used on an automatically-determined segment ranking in order to provide for highly accurate potential song segments that are responsive to the audio command and audio command context. In some embodiments, the segment ranking 220 is static (e.g., not changing until updated later), while in other embodiments, may be determined dynamically (e.g., on-demand) using the latest/freshest data (e.g., play data 222). In some embodiments, multiple audio command contexts may be received (e.g., "[Wakeword], play me "Sweet Child O' Mine and start at the good part"), and separate segment rankings may be performed for each audio command context, or a single ranking may be used, where the top-ranked segment is used for one of the audio command contexts and the second-ranked segment is used for the other audio command contexts, for example.

Figure 3:
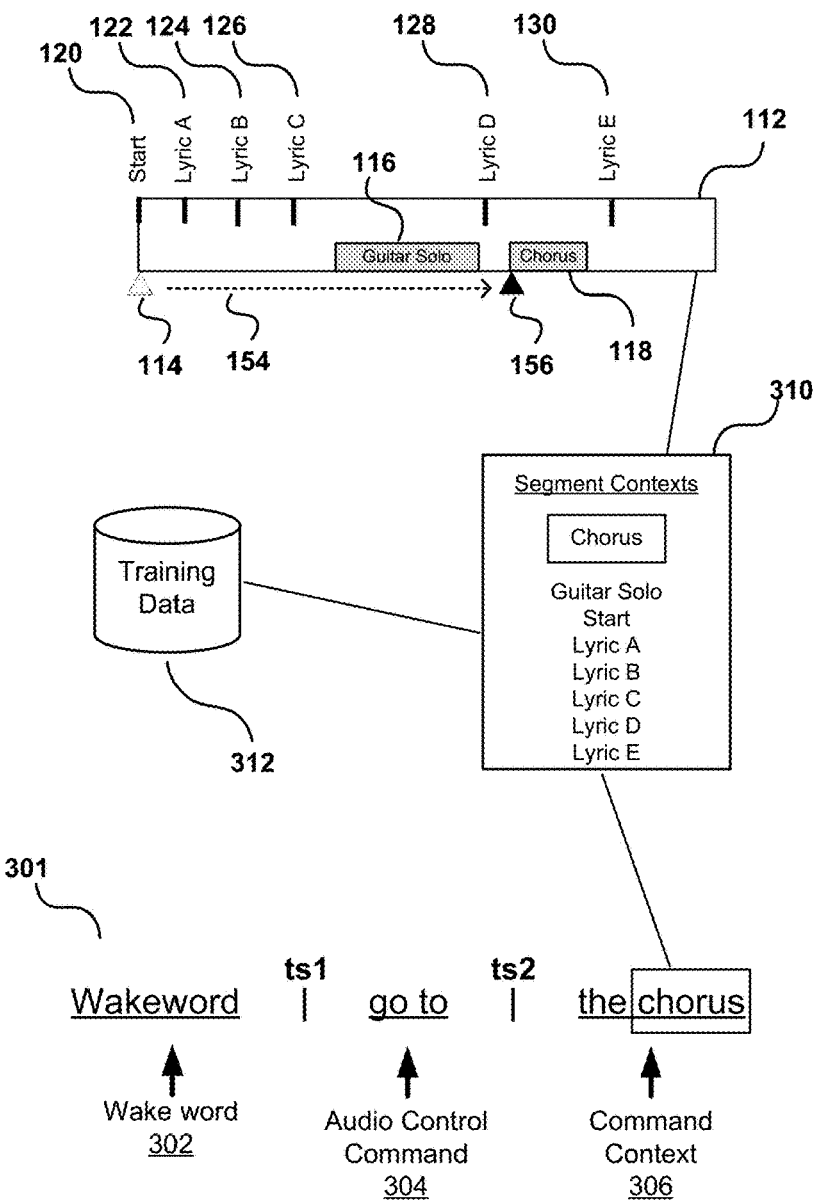
FIG. 3 illustrates an example approach 300 to evaluating an audio command, in accordance with various embodiments.

FIG. 3 illustrates an example approach 300 to evaluating an audio command, in accordance with various embodiments. In the example of FIG. 3, as mentioned, the audio data 301 can include at least one wakeword 302 that causes the voice communications device 106 to capture audio data for processing. Although shown to be positioned near a starting point of the audio data 301, as mentioned elsewhere herein the wakeword may be positioned at other locations in the audio data as well. In this example, the location of the wakeword 302 in the audio data 301 can be determined, and a first timestamp (ts1) determined that corresponds to an end of the wakeword 302. The timestamp can be positioned at the end of the wakeword 302, at the beginning of the next word, or anywhere during the section or period of audio data there between. In some embodiments the wakeword 302 may not be included in the audio data uploaded for processing where the voice communications device has the ability to determine and verify the presence of the wakeword and remove that portion from the audio data or only record data coming after the wakeword, among other such options.

The portion of the audio data not including the wakeword 302 can be analyzed to attempt to determine an audio control command 304 or action to be performed with respect to a command context 306. In this example the audio control command 304 can be determined to be the word "play" or the phrase "go to," among other such options. Other audio control commands 304 can be identified as well, such as "skip," "share," or "find," etc. The ability to identify the audio control command 304 can ensure that the appropriate action is taken and that the command context 306, as appropriate, is delivered to the appropriate system or service or otherwise processed accordingly. The ability to identify the audio control command 304 can also identify the expected pattern for a remainder of the audio data, which can help to identify other portions of the audio data. For example, a audio control command 304 (or domain) can have a typical pattern that includes the terms "play" or "go to," followed by a command context 306. In the example audio data 301 of FIG. 3, the command context 306 can be identified as "the chorus," or potentially "chorus," with any remainder of the message being identified as further context or superfluous. Because it can be desired to ensure that the entire spoken message payload is included, the audio data 301 may also include some amount of silence (or at least lack of spoken content) after the message but before an end of the audio data clip. As indicated, at least one timestamp can be generated to identify the boundaries (or start/stop points) of each of these "slots" of the pattern in the audio data. In this example a first timestamp (ts1) indicates an end of the wakeword 302 and/or start of the audio control command 304 slot. A second timestamp (ts2) can indicate an end of the audio control command 304 and beginning of the command context 306 slot. Further timestamps (not illustrated) may also be included, for example to identify an end of the message portion, in order to prevent unnecessary processing of the "silent" portion proximate an end of the audio data. Thus, a set of timestamp data might be returned (relative to a beginning time of the audio data or a recorded system clock time, etc.) such as TS1=0.083, TS2=1.75, TS3=2.14, TS4=3.63. These timestamps can be used with the audio data to identify specific portions of the audio data.

In the example of FIG. 3, training data 312 (e.g., a classifier, neural network processing, etc.) may be utilized; for example, on a training set of songs that have various characteristics (e.g., song segment contexts) that are desired to be identified. This may include choruses, acoustic patterns and/or changes such as tempo, volume, energy, major/minor keys, explicit lyrics, instrumental sections (solos, etc.), vocal inflections, lyrics (words, start of lines, etc.). This training data may then be used on a song 112 to automatically identify song segment contexts that are similar or otherwise identifiable from the training data. For example, the guitar solo 116 song segment context and the chorus 118 song section context may have been automatically identified by comparing the song audio data through a classifier or neural network that relies on the training data 312.

A list of the identified segment contexts 310 may be generated, and used in context with a ranking or scoring system (as discussed previously) to assist in matching the command context 306 (e.g., the text "chorus" determined by a speech-to-text function on the audio data 301 to a text "chorus" associated with a song segment that has been identified, for example by a classifier or via human curation, etc.). As a result of using the technique illustrated in FIG. 3, playback of the song 112 may be "scrubbed" 154 to the song segment associated with the "chorus" song segment context 118, as shown by the new position of the "thumb" 156. In another example, lyrics identified as "explicit," for example by automated classifier approaches, tagging, etc., may be skipped via an audio command such as "skip the explicit parts." Lyrics such as "lyric B" and "lyric D," which may be individual words or entire lyrical stanzas or lines, may then be identified and the playback of the song modified to exclude those song segments, or only include the non-explicit portions, for example.

Also, an audio command such as "repeat the last line," or "what did she say" may be used with song segment contexts associated with lyrics to allow for replaying the last lyric or reaching back further to satisfy the audio command. According to various embodiments, "scrubbing data" or other activity may be stored in association with a user profile, such as at the resource provider environment 110, music service, etc. For example, data indicating a number of times a user has interacted with a song, such as scrubbing ahead, skipping into or out of, turning volume up or down, etc., may be stored in a profile, such that when the user issues an audio command to play the particular song, the profile may be utilized; for example, to determine that the user has skipped to a particular segment in the song above a threshold number of times, etc., such that the action is automatically taken on the song in response to receiving the audio command to play the song.

Figure 4:
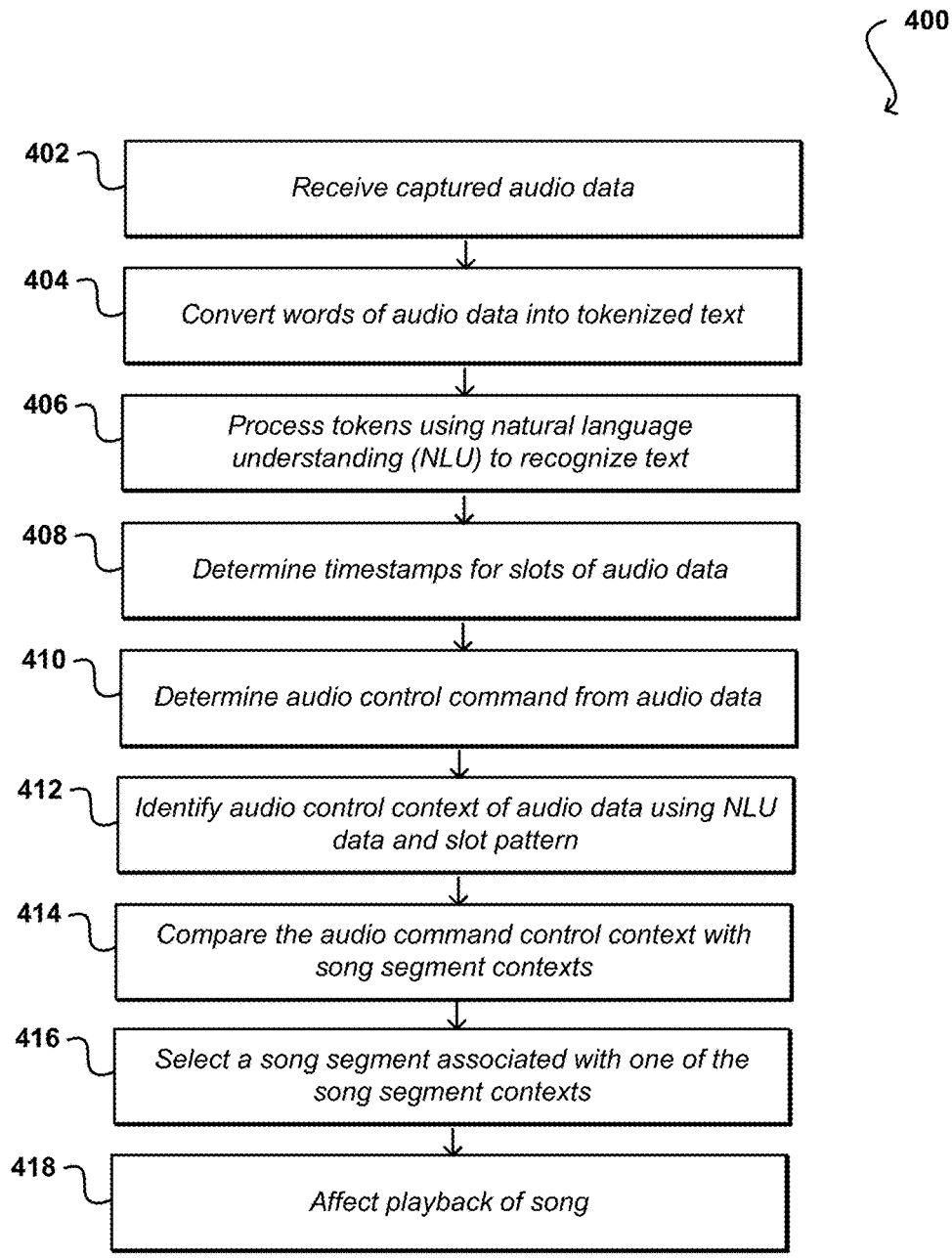
FIG. 4 illustrates an example process 400 for using voice control with audio data that can be used in accordance with various embodiments.

FIG. 4 illustrates an example process 400 for using voice control with audio data that can be used in accordance with various embodiments. It should be understood that, for any process discussed herein, there can be additional, fewer, or alternative steps performed in similar or alternative orders, or in parallel, within the scope of the various embodiments unless otherwise stated. In this example, audio data captured by a voice communications device, or other such mechanism, is received 602, such as to a speech processing service or other such system. In this example, the audio data is analyzed to identify and convert 404 the words represented in the audio data into tokenized text. This can include, for example, processing the audio data using an automatic speech recognition (ASR) module that is able to recognize human speech in the audio data and then separate the words of the speech into individual tokens that can be sent to a natural language understanding (NLU) module, or other such system or service. The tokens can be processed 406 by the NLU module to attempt to determine a slot or purpose for each of the words in the audio data. For example, the NLU module can attempt to identify the individual words, determine context for the words based at least in part upon their relative placement and context, and then determine various purposes for portions of the audio data. For example, the NLU can process the words "play the song" together to identify this as an audio command. There can be variations to such an intent, but words such as "play" or "go to" can function as a primary trigger word, for example, which can cause the NLU module to look for related words that are proximate the trigger word in the audio data. Other variations such as "I want to play" may also utilize the same trigger word, such that the NLU may need to utilize context, machine learning, or other approaches to properly identify the intent. A set of timestamps can be determined 408 that correspond to various breaks and/or points in the audio data.

Using this or other technology discussed or suggested herein, an audio command can be determined 410 for the audio data (e.g., an "intent" can be the audio control command, the command context, and/or other aspects of the audio data that may be operated on. As mentioned, once the audio command is determined then a messaging "domain" can be used to process the audio data, where the domain determines the patterns, libraries, slot criteria, or other aspects or functionality that are applicable to audio commands. Using the NLU-processed data and the slot pattern, an audio command context, among other portions for the audio command can be determined 412. As mentioned, this can include the audio command, followed by the audio command context, among other such options. In an embodiment, there may be multiple audio commands and/or audio command contexts determined in this or other approaches. The audio command context associated with the audio command can be compared with song segment contexts, and a song segment context selected 416, for example using a ranking or scoring function, in some embodiments generated by using classifier data or neural network classification. Once the song segment context is selected, playback of the song may be affected 418; for example, a song may be started, current playback may be modified (skipped, scrubbed, etc.), a new song may be played, etc.

Figure 5:
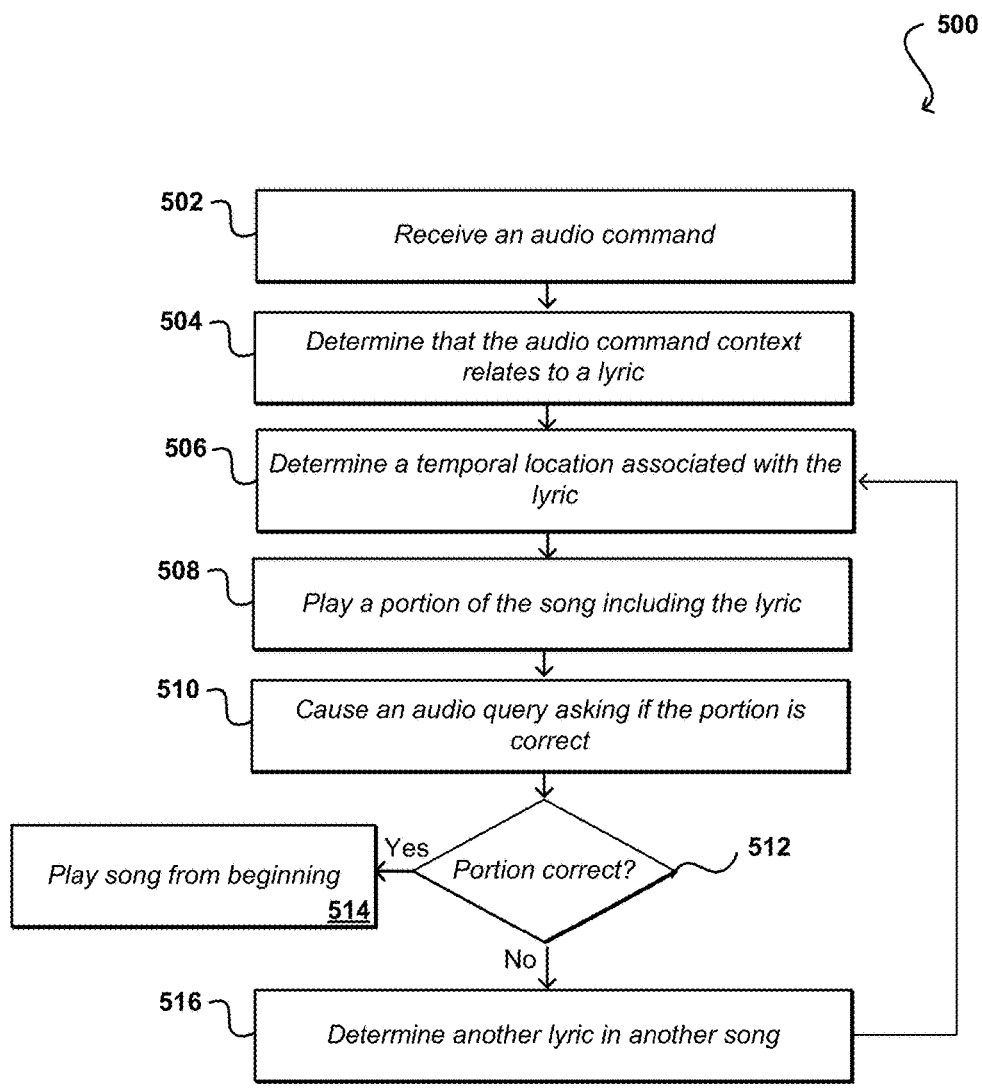
FIG. 5 illustrates an example process 500 for using voice control with audio data that can be used in accordance with various embodiments.

FIG. 5 illustrates an example process 500 for using voice control with audio data that can be used in accordance with various embodiments. In this example, an audio command is received 502, for example at a voice communications device that identifies the audio command using various audio recognition techniques described herein. It may be determined that the audio command context relates to a particular lyric 504; for example, "play me the song that includes "any way you want it." Once the song having the lyric is determined, for example using the song segment context matching approaches described herein, a temporal location (e.g., timestamp, offset, etc.) relating to one of the occurrences of the identified lyric is determined 506. A portion of the song containing the lyric (e.g., the song segment) is played 508, and an audio query is played 510, that for example queries whether that was the song the user was looking for 512. If the user answers in the affirmative, then the song is played 514; for example, from the beginning, although other implementations are envisioned. If the user answers, "no," then another lyric in another song may be determined 516, for example to find the right song, and control passes back to step 506.

Figure 6:
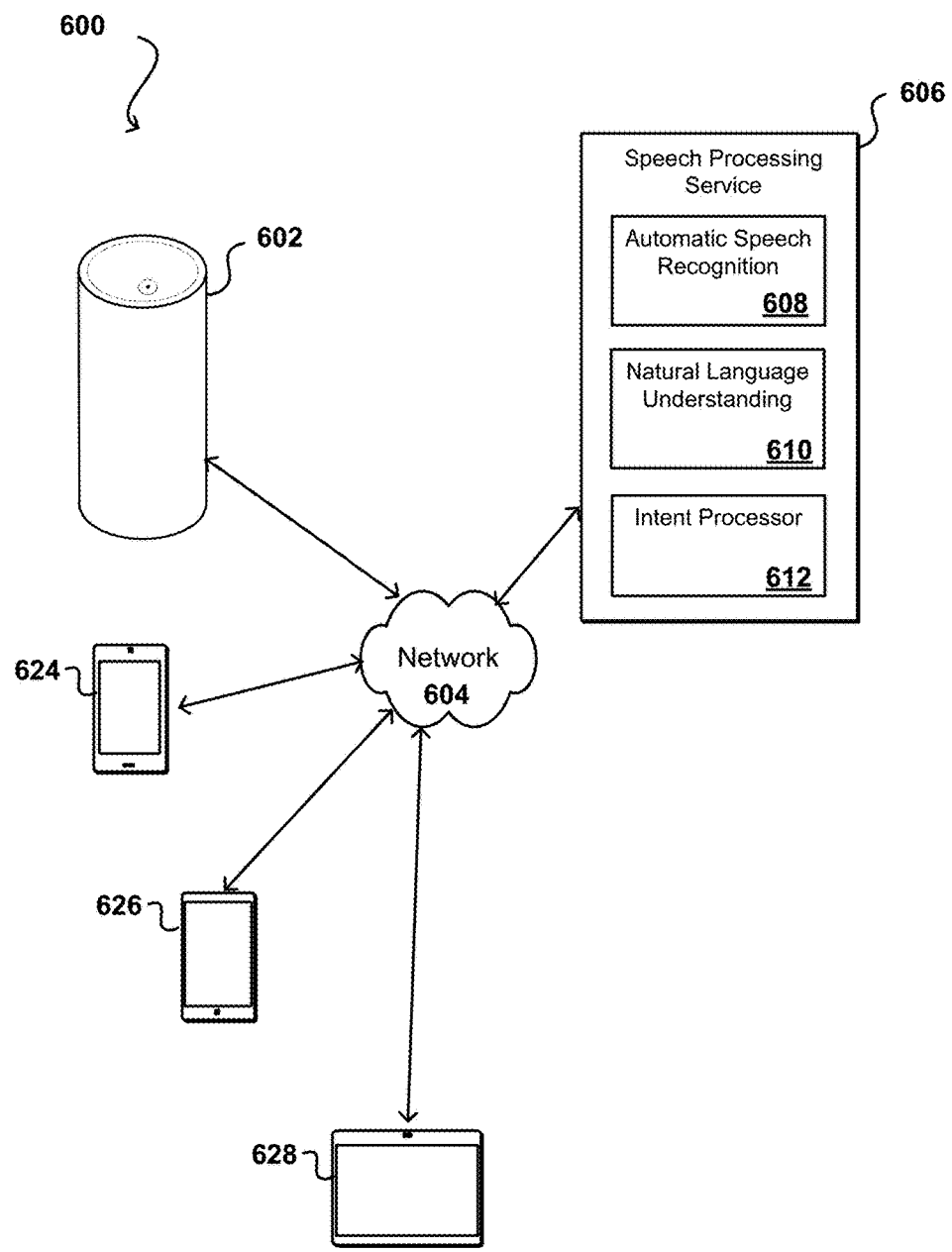
FIG. 6 illustrates an example system for determining audio commands that can be utilized in accordance with various embodiments.

FIG. 6 illustrates an example system for determining audio commands that can be utilized in accordance with various embodiments. Although a voice communications device 602 (e.g., an Amazon Echo) is shown communicating with portable devices 624, 626, 628 such as smart phones or tablet computers, it should be understood that various other types of electronic devices that are capable of receiving and processing communications can be used in accordance with various embodiments discussed herein. These devices can include, for example, notebook computers, ultrabooks, personal data assistants, video gaming consoles, televisions, set top boxes, smart televisions, portable media players, unmanned devices (e.g., drones or autonomous vehicles), wearable computers (e.g., smart watches, smart glasses, bracelets, etc.), display screens, display-less devices, virtual reality headsets, display-based devices, smart furniture, smart household devices, smart vehicles, smart transportation devices, and/or smart accessories, among others.

A microphone or other signal capture component can capture an audio signal, such as a voice command, and perform at least some basic processing of the audio signal. For example, an application (e.g., a media service) executing on the voice communications device, or otherwise in communication with the voice communications device, can analyze the audio signal corresponding to a user's speech (also referred to herein as an utterance) that includes audio input data to perform at least one function. The functions can include, for example, placing a call, answering a question, playing music, reading audiobooks, controlling connected devices via voice commands/instructions, or sending an electronic message (e.g., a text message or a voice message), among other such functions.

The voice communications device can be associated with a customer account provided by a service provider. The service provide can provide resources through a resource provider environment, which in this example can include a speech processing service 606 and/or a audio management service 616. The customer account can include one or more profiles, e.g., one or more family member profiles or other profiles, where each profile can be associated with preferences, access rights, and other information, and may share certain account settings as may include payment information (same credit card), address, media content access types, etc. In the situation where one of the members desires to have an action performed, the member can activate the voice communications device, for example, using a wakeword (e.g., "Alexa"), and then speak the request or command. In some embodiments the member can announce his or her name in order to cause the device to load the appropriate member profile and corresponding preferences, access rights, and other such information. In various embodiments, rather than have a member announce a name, the voice communications device can automatically determine the member speaking using speech analysis software, logged in accounts, and the like. For example, an application executing on the voice communications device or otherwise in communication with the device can analyze the speaker's voice to determine an identity of the speaker and associated profile. Based on the identity of the speaker, the appropriate member profile and corresponding preferences, access rights, and contracts authority can be used. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In this example, the customer account can be associated with a user profile associated with the speaking user, where the user has associated at least one music service with their user account. The music service can include, as previously discussed, audio stored on a device or accessed via a network, such as a music subscription service. In response to the user speaking the phrase "Wakeword, play [song]," audio input data that includes the phrase is received at the voice communications device 602 and an application executing on the voice communications device or otherwise in communication with the voice communications device can analyze the audio input data. For example, the contents of the audio input data can be streamed to a speech processing service 606 that can analyze the portions of the audio data upon receipt. In some embodiments, the backend server can begin processing one or more portions of the audio input data prior to the user having completed making the instructions. Thus, the speech processing service 606 can start analyzing whatever portion of the audio input data the service received through a variety of techniques such as automatic speech recognition (ASR) 608 and natural language understanding (NLU) 110 to convert the audio input data into a series of identifiable words, and then to analyze those words using a context interpreter or other such system or service to interpret the meaning of the request from the user. The speech processing service 606 can utilize the ASR 608 to recognize the spoken words that were recorded and stored in the audio data and to translate them into known text that can then be analyzed by the NLU 610 to attempt to decipher the meaning of the request from the user. Any suitable computer implemented speech-to-text converter can be used to convert the received audio signal(s) into text. In some embodiments, one or more filters may be applied to the received audio input data to reduce or minimize extraneous noise, however this is not required. The output of the NLU can be provided to an intent processor 612 to determine information such as the intent of the utterance, the command context, and the like. In this example, analyzing the audio input data can include determining contact information "Bob" and an instruction or intent to "play a song." The speech processing service 606 can determine information from the user's data to identify a song, etc.

Figure 7:
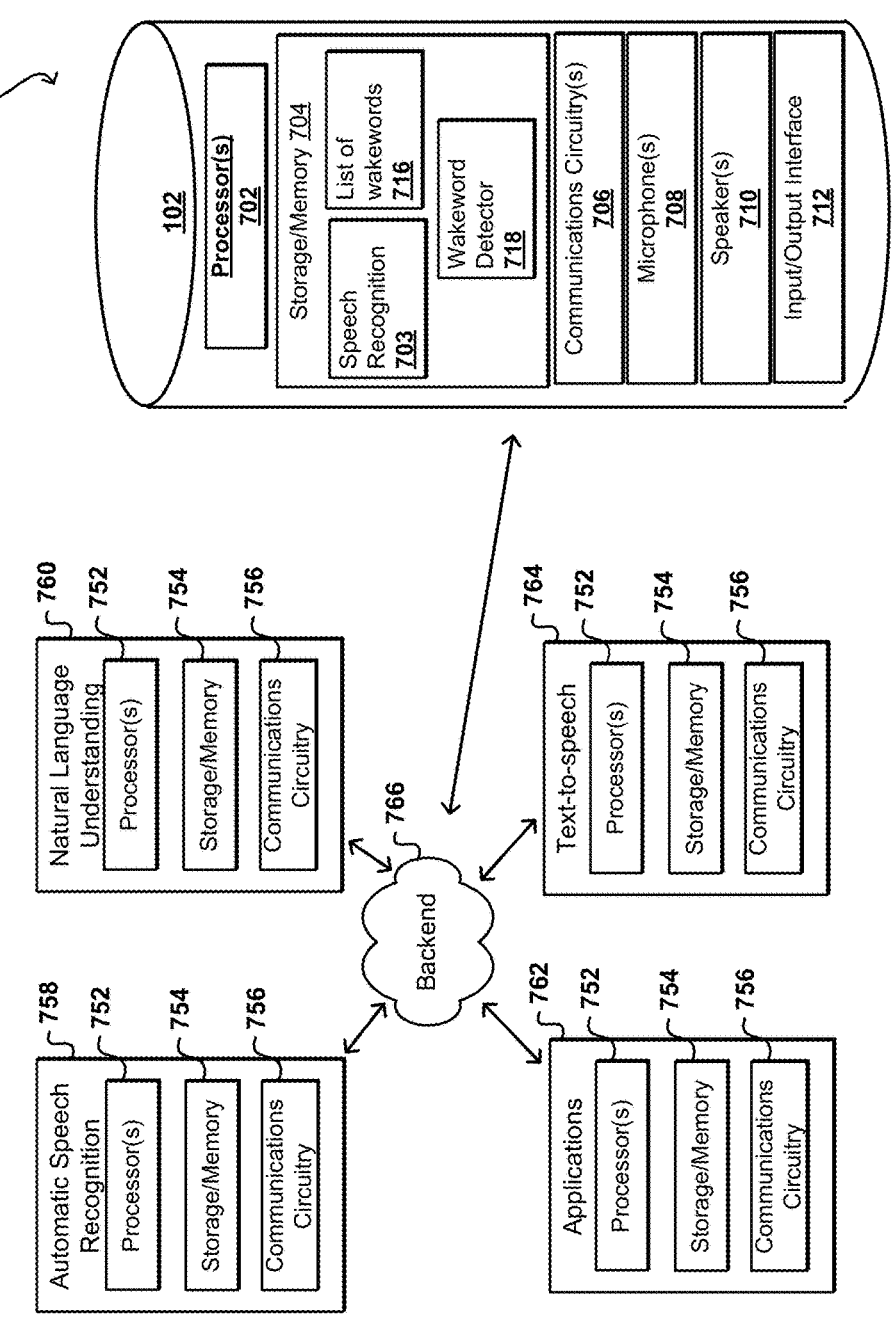
FIG. 7 is another example environment 700 for implementing aspects in accordance with various embodiments.

FIG. 7 is another example environment 700 for implementing aspects in accordance with various embodiments. In this example, voice-enabled communications device 102, in some embodiments, may correspond to any type of electronic device capable of being activated in response to detecting a specific sound. Voice-enabled communications device 102 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled communications device 102 may be relatively simple or basic in structure such that no mechanical input option(s) (e.g., keyboard, mouse, trackpad) or touch input(s) (e.g., touchscreen, buttons) may be provided. For example, voice-enabled communications device 102 may be capable of receiving and outputting audio, and may include power, processing capabilities, storage/memory capabilities, and communication capabilities.

Voice-enabled communications device 102 may include a minimal number of input mechanisms, such as a power on/off switch, however primary functionality, in one embodiment, of voice-enabled communications device 102 may solely be through audio input and audio output. For example, voice-enabled communications device 102 may listen for a wakeword by continually monitoring local audio. In response to the wakeword being detected, voice-enabled communications device 102 may establish a connection with backend server 1008, send audio input data to backend server 1008, and await/receive a response from backend server 1008. In some embodiments, however, non-voice-enabled devices may also communicate with backend server 1008 (e.g., push-to-talk devices).

Voice-enabled communications device 102 may include one or more processors 702, storage/memory 704, communications circuitry 706, one or more microphones 708 or other audio input devices (e.g., transducers), one or more speakers 710 or other audio output devices, as well as an optional visual input/output ("I/O") interface 712. However, one or more additional components may be included within voice-enabled communications device 102, and/or one or more components may be omitted. For example, voice-enabled communications device 102 may include a power supply or a bus connector. As another example, voice-enabled communications device 102 may not include a visual I/O interface. Furthermore, while multiple instances of one or more components may be included within voice-enabled communications device 102, for simplicity only one of each component has been shown.

Processor(s) 702 may include any suitable processing circuitry capable of controlling operations and functionality of voice-enabled communications device 102, as well as facilitating communications between various components within voice-enabled communications device 102. In some embodiments, processor(s) 702 may include a central processing unit ("CPU"), a graphic processing unit ("GPU"), one or more microprocessors, a digital signal processor, or any other type of processor, or any combination thereof. In some embodiments, the functionality of processor(s) 702 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 702 may include its own local memory, which may store program modules, program data, and/or one or more operating systems. However, processor(s) 702 may run an operating system ("OS") for voice-enabled communications device 102, and/or one or more firmware applications, media applications, and/or applications resident thereon.

Storage/memory 704 may include one or more types of storage mediums such as any volatile or non-volatile memory, or any removable or non-removable memory implemented in any suitable manner to store data on voice-enabled communications device 102. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 704 may be implemented as computer-readable storage media ("CRSM"), which may be any available physical media accessible by processor(s) 702 to execute one or more instructions stored within storage/memory 704. In some embodiments, one or more applications (e.g., gaming, music, video, calendars, lists, etc.) may be run by processor(s) 702, and may be stored in memory 704.

In some embodiments, storage/memory 704 may include one or more modules and/or databases, such as speech recognition module 703, list of wakewords database 716, and wakeword detection module 718. Speech recognition module 703 may, for example, include an automatic speech recognition ("ASR") component that recognizes human speech in detected audio. Speech recognition module 703 may also include a natural language understanding ("NLU") component that determines user intent based on the detected audio. Also included within speech recognition module 703 may be a text-to-speech ("TTS") component capable of converting text to speech to be outputted by speaker(s) 710, and/or a speech-to-text ("STT") component capable of converting received audio signals into text to be sent to backend server 708 for processing.

List of wakewords database 716 may be a database stored locally on voice-enabled communications device 102 that includes a list of a current wakeword for voice-enabled communications device 102, as well as one or more previously used, or alternative, wakewords for voice-enabled communications device. In some embodiments, user 102 may set or program a wakeword for voice-enabled communications device 102. The wakeword may be programmed directly on voice-enabled communications device 102, or a wakeword or words may be set by the individual via a backend server application (app) that is in communication with backend server 708. For example, a user may use their mobile device having the backend server application running thereon to set the wakeword. The specific wakeword may then be communicated from the mobile device to backend server 708, which in turn may send/notify voice-enabled communications device 102 of the individual's selection for the wakeword. The selected activation may then be stored in list of wakewords database 716 of storage/memory 704.

Wakeword detection module 718 may include an expression detector that analyzes an audio signal produced by microphone(s) 708 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 708. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 708. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled communications device 102 may then begin sending the audio signal to backend server 708 for detecting and responds to subsequent utterances made by a user.

Communications circuitry 706 may include any circuitry allowing or enabling voice-enabled communications device 102 to communicate with one or more devices, servers, and/or systems. For example, communications circuitry 706 may facilitate communications between voice-enabled communications device 102 and backend server 708. Communications circuitry 706 may use any communications protocol, such as any of the previously mentioned exemplary communications protocols. In some embodiments, voice-enabled communications device 102 may include an antenna to facilitate wireless communications with a network using various wireless technologies (e.g., Wi-Fi, Bluetooth, radiofrequency, etc.). In yet another embodiment, voice-enabled communications device 102 may include one or more universal serial bus ("USB") ports, one or more Ethernet or broadband ports, and/or any other type of hardwire access port so that communications circuitry 706 allows voice-enabled communications device 102 to communicate with one or more communications networks.

Voice-enabled communications device 102 may also include one or more microphones 708 and/or transducers. Microphone(s) 708 may be any suitable component capable of detecting audio signals. For example, microphone(s) 708 may include one or more sensors for generating electrical signals and circuitry capable of processing the generated electrical signals. In some embodiments, microphone(s) 708 may include multiple microphones capable of detecting various frequency levels. As an illustrative example, voice-enabled communications device 102 may include multiple microphones (e.g., four, seven, ten, etc.) placed at various positions about voice-enabled communications device 102 to monitor/capture any audio outputted in the environment where voice-enabled communications device 102 is located. The various microphones 708 may include some microphones optimized for distant sounds, while some microphones may be optimized for sounds occurring within a close range of voice-enabled communications device 102.

Voice-enabled communications device 102 may further include one or more speakers 710. Speaker(s) 710 may correspond to any suitable mechanism for outputting audio signals. For example, speaker(s) 710 may include one or more speaker units, transducers, arrays of speakers, and/or arrays of transducers that may be capable of broadcasting audio signals and or audio content to a surrounding area where voice-enabled communications device 102 may be located. In some embodiments, speaker(s) 710 may include headphones or ear buds, which may be wirelessly wired, or hard-wired, to voice-enabled communications device 102, that may be capable of broadcasting audio.

In some embodiments, one or more microphones 708 may serve as input devices to receive audio inputs, such as speech. Voice-enabled communications device 102, may then also include one or more speakers 710 to output audible responses. In this manner, voice-enabled communications device 102 may function solely through speech or audio, without the use or need for any input mechanisms or displays.

In one exemplary embodiment, voice-enabled communications device 102 includes I/O interface 712. The input portion of I/O interface 712 may correspond to any suitable mechanism for receiving inputs from a user of voice-enabled communications device 102. For example, a camera, keyboard, mouse, joystick, or external controller may be used as an input mechanism for I/O interface 712. The output portion of I/O interface 712 may correspond to any suitable mechanism for generating outputs from voice-enabled communications device 102. For example, one or more displays may be used as an output mechanism for I/O interface 712. As another example, one or more lights, light emitting diodes ("LEDs"), or other visual indicator(s) may be used to output signals via I/O interface 712 of voice-enabled communications device 102. In some embodiments, one or more vibrating mechanisms or other haptic features may be included with I/O interface 712 to provide a haptic response to user 102 from voice-enabled communications device 102. Persons of ordinary skill in the art will recognize that, in some embodiments, one or more features of I/O interface 712 may be included in a purely voice-enabled version of voice communications device 102. For example, one or more LED lights may be included on voice-enabled communications device 102 such that, when microphone(s) 708 receive audio from user 102, the one or more LED lights become illuminated signifying that audio has been received by voice-enabled communications device 102. In some embodiments, I/O interface 712 may include a display screen and/or touch screen, which may be any size and/or shape and may be located at any portion of voice-enabled communications device 102. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 7 also includes backend server 766, as mentioned previously, which may be in communication with voice-enabled communications device 102. Backend server 766 (e.g., part of a resource provider environment) includes various components and modules including, but not limited to, automatic speech recognition ("ASR") module 758 (which may include, for example, speech-to-text ("STT") functionality), natural language understanding ("NLU") module 760, applications module 762, and text-to-speech ("TTS") module 764. In some embodiments, backend server 766 may also include computer readable media, including, but not limited to, flash memory, random access memory ("RAM"), and/or read-only memory ("ROM"). Backend server 766 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 758 may be configured such that it recognizes human speech in detected audio, such as audio captured by voice-enabled communications device 102, which is then sent to backend server 766. ASR module 758 may include, in one embodiment, one or more processor(s) 752, storage/memory 754, and communications circuitry 756. Processor(s) 752, storage/memory 754, and communications circuitry 756 may, in some embodiments, be substantially similar to processor(s) 702, storage/memory 704, and communications circuitry 706, which are described in greater detail above, and the aforementioned descriptions of the latter may apply. NLU module 760 may be configured such that it determines user intent based on the detected audio received from voice-enabled communications device 102. NLU module 760 may include processor(s) 752, storage/memory 754, and communications circuitry 756.

Applications module 762 may, for example, correspond to various action specific applications or servers capable of processing various task specific actions. Applications module 762 may further correspond to first party applications and/or third party applications operable to perform different tasks or actions. For example, based on the context of audio received from voice-enabled communications device 102, backend server 766 may use a certain application to perform an action, such refining an active play queue of media content. Applications module 762 may include processor(s) 752, storage/memory 754, and communications circuitry 756. As an illustrative example, applications module 762 may correspond to a media service. The electronic media service application of the applications module 762 can be associated with a customer account. The customer account can include at least one profile stored in, for example, user information that can be linked to the electronic media service application in applications module 762. Audio input data can be received at automatic speech recognition module 758 from voice communications device 102. The automatic speech recognition module 758 can use automatic speech recognition (ASR) techniques on the audio input data to generate text data of the audio input data. The natural language understanding module 760 can use natural language understanding (NLU) techniques on the text data to determine refinement/attribute information to manage the active play queue. The electronic media service application of the applications module 762 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc. In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music.

TTS module 764 may employ various text-to-speech techniques. It should be noted that techniques for taking text and converting it into audio input data that can represent speech are well known in the art and need not be described in further detail herein, any suitable computer implemented techniques may be used. TTS module 764 may also include processor(s) 752, storage/memory 754, and communications circuitry 756.

Persons of ordinary skill in the art will recognize that although each of ASR module 758, NLU module 760, applications module 762, and TTS module 764 include instances of processor(s) 752, storage/memory 754, and communications circuitry 756, those instances of processor(s) 752, storage/memory 754, and communications circuitry 756 within each of ASR module 758, NLU module 760, applications module 762, and STT/TTS module 764 may differ. For example, the structure, function, and style of processor(s) 752 within ASR module 758 may be substantially similar to the structure, function, and style of processor(s) 752 within NLU module 760, however the actual processor(s) 752 need not be the same entity.

Figure 8:
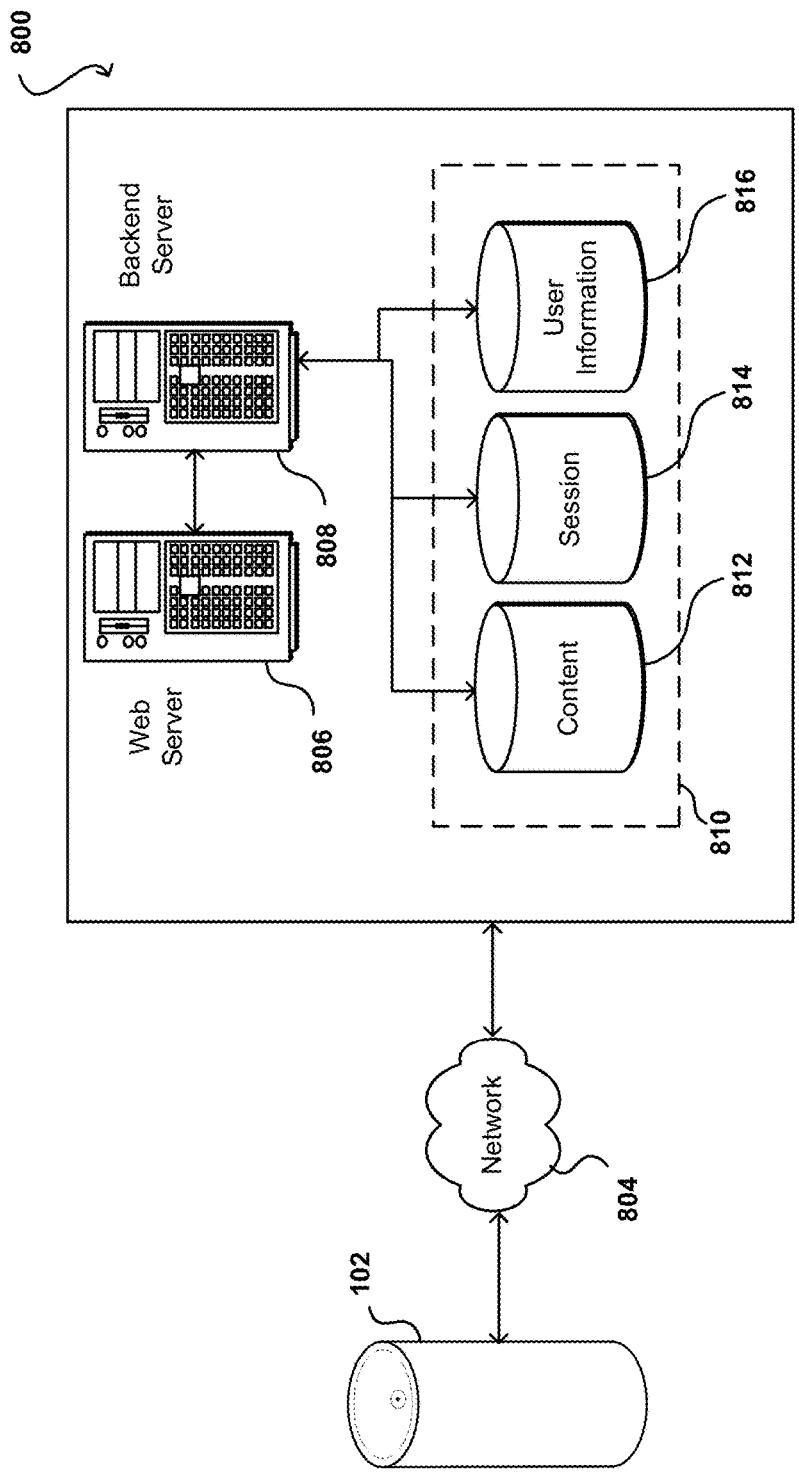
FIG. 8 illustrates an example of an environment 800 for implementing aspects in accordance with various embodiments.

In accordance with various embodiments, different approaches can be implemented in various environments in accordance with the described embodiments. For example, FIG. 8 illustrates an example of an environment 800 for implementing aspects in accordance with various embodiments (e.g., a resource provider environment). As will be appreciated, although a Web-based environment is used for purposes of explanation, different environments may be used, as appropriate, to implement various embodiments. The system includes voice communications device 102, which can include any appropriate device operable to send and receive requests, messages or information over network 804 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one backend server 808 and a data store 810. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 808 can include any appropriate hardware and software for integrating with the data store 810 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 806 in the form of HTML, XML or another appropriate structured language in this example. The handling of all requests and responses, as well as the delivery of content between the voice communications device 102 and the backend server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be other information that may need to be stored in the data store, such as page image information and access rights information, which can be stored in any of the above listed mechanisms as appropriate or in additional mechanisms in the data store 810. The data store 810 is operable, through logic associated therewith, to receive instructions from the backend server 808 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one device processor;
   a memory device including instructions that, when executed by the at least one device processor, cause the system to:
   receive audio input data from a voice communications device, the audio input data corresponding to an utterance received by a microphone of the voice communications device;
   generate text data from the audio input data by performing automated speech recognition (ASR) on the audio input data;
   determine an audio control command at least in part by performing natural language processing (NLP) on the text data;
   determine a song in a music library, wherein the song is associated with data comprising one or more song segment markers, each song segment marker corresponding to a temporal location in the song and having a song segment context;
   determine, using at least results of the NLP performed on the text data, a command context associated with the audio control command, the command context comprising a portion of lyric data of the particular song;
   determine a target song segment marker in the song based at least in part on a comparison of the command context and the song segment contexts of the song segment markers of the song;
   identify a target temporal location in the song corresponding to the temporal location of the target song segment marker; and
   cause playback of the song on an audio output device, the playback including the target temporal location.

2. The system of claim 1, wherein the instructions, when executed further cause the system to:
   determine that the audio control command comprises a command to play a particular song; and
   determine a comparison between the portion of lyric data and song segment contexts of the song comprising lyrics.

3. The system of claim 2, wherein the instructions, when executed further cause the system to:
   cause a portion of the song to be played on the audio output device, wherein the portion of the song begins at the target temporal location;
   cause an audio query to be played at the voice communications device after the portion of the song is finished playing on the audio output device; and
   receive audio response data in response to the audio query, the audio response data corresponding to an utterance received by a microphone of the voice communications device.

4. The system of claim 1, wherein the instructions, when executed further cause the system to:
   obtaining a data set including identified song segment contexts for each of a plurality of training songs; and
   training a classifier using the identified song segment contexts, the classifier configured to determine at least one identified song segment context associated with a query song.

5. A computer-implemented method, comprising:
   causing a song to be played on an audio output device, the song comprising a plurality of song segments, each song segment corresponding to a portion of the song and being associated with a song segment context;
   receiving audio input data corresponding to an utterance received by a microphone of a voice communications device, the voice communications device associated with a customer of a music listening service;
   determining, from the audio input data, an audio control command specified by one or more words represented in the utterance, the audio control command comprising an command context;
   comparing the command context with each song segment context of the song;
   determining one or more song segment contexts based on the comparison; and
   causing a current playback location of the song to change, such that the song segment corresponding to one song segment context of the one or more determined song segment contexts is played on the audio output device.

6. The computer-implemented method of claim 5, wherein the voice communications device comprises the audio output device.

7. The computer-implemented method of claim 5, wherein a plurality of song segment contexts are determined based on the comparison, and further comprising:
   determining prior playback data corresponding to each song segment associated with the one or more song segment contexts, the prior playback data being associated with a plurality of customers of the music listening service;
   determining a ranking value for each of the plurality of song segment contexts based on the prior playback data; and;
   selecting the one song segment context based at least in part on the ranking value.

8. The computer-implemented method of claim 7, wherein the prior playback data comprises at least one of playback volume changes during playback of the song segment or playback skip requests received during playback of the song segment.

9. The computer-implemented method of claim 7, further comprising:
determining a subset of the prior playback data corresponding to song segments located within a threshold amount of time from a beginning of the song or an end of the song; and
modifying the ranking value for the song segments corresponding to the subset of the prior playback data.

10. The computer-implemented method of claim 5, further comprising:
determining that the command context corresponds to replaying a previously-played lyric of the song,
wherein the one or more song segment contexts comprise lyrics.

11. The computer-implemented method of claim 5, wherein the voice communications device is associated with a customer of a music listening service, and further comprising:
storing scrubbing data associated with the customer and the song, the scrubbing data comprising a number of times an audio control command was received for the song and the song segments corresponding to the audio control command;
receiving a new audio control command, the new audio control command having an command context corresponding to new playback of the song;
determining, based on the scrubbing data for the song, that a particular audio control command has been received during playback of the song greater than a threshold of times; and
causing the new playback of the song to be modified based on the particular audio control command.

12. The computer-implemented method of claim 5, wherein the song segment context and the command context comprise at least one of an acoustic pattern, an acoustic change, a chorus, a bridge, an intro, a refrain, an instrumental solo, a vocal solo, an explicit lyric, tempo, popularity, a user data-based context, time, or a lyric.

13. The computer-implemented method of claim 5, further comprising:
obtaining a data set including identified song segment contexts for each of a plurality of training songs; and
training a classifier using the identified segment contexts, the neural network configured to determine at least one identified segment context associated with a query song.

14. The computer-implemented method of claim 13, wherein training the classifier includes utilizing at least one machine learning algorithm, wherein the machine learning algorithm is based on one of a principal component analysis (PCA) algorithm, a neural network, a support vector machine, an inductive learning algorithm, a decision tree algorithm, a random forest algorithm, an adaptive boosting algorithm, or a deep learning algorithm.

15. A system, comprising:
at least one processor; and
memory including instructions that, when executed by the at least one processor, enable the system to:
cause a song to be played on an audio output device, the song comprising a plurality of song segments, each song segment corresponding to a portion of the song and being associated with a song segment context;
receive audio input data corresponding to an utterance received by a microphone of a voice communications device, the voice communications device associated with a customer of a music listening service;
determine, from the audio input data, an audio control command specified by one or more words represented in the utterance, the audio control command comprising an command context;
compare the command context with each song segment context of the song;
determine one or more song segment contexts based on the comparison; and
cause a current playback location of the song to change, such that the song segment corresponding to one song segment context of the one or more determined song segment contexts is played on the audio output device.

16. The system of claim 15, wherein a plurality of song segment contexts are determined based on the comparison, and wherein the instructions when executed further enable the system to:
determine prior playback data corresponding to each song segment associated with the one or more song segment contexts, the prior playback data being associated with a plurality of customers of the music listening service;
determine a ranking value for each of the plurality of song segment contexts based on the prior playback data; and;
select the one song segment context based at least in part on the ranking value.

17. The system of claim 16, wherein the prior playback data comprises at least one of playback volume changes during playback of the song segment or playback skip requests received during playback of the song segment.

18. The system of claim 16, wherein the instructions when executed further enable the system to:
determine a subset of the prior playback data corresponding to song segments located within a threshold amount of time from a beginning of the song or an end of the song; and
modify the ranking value for the song segments corresponding to the subset of the prior playback data.

19. The system of claim 16, wherein the voice communications device is associated with a customer of a music listening service, and wherein the instructions when executed further enable the system to:
storing scrubbing data associated with the customer and the song, the scrubbing data comprising a number of times an audio control command was received for the song and the song segments corresponding to the audio control command;
receiving a new audio control command, the new audio control command having an command context corresponding to new playback of the song;
determining, based on the scrubbing data for the song, that a particular audio control command has been received during playback of the song greater than a threshold of times; and
causing the new playback of the song to be modified based on the particular audio control command.

20. The system of claim 15, wherein the instructions when executed further enable the system to:
determining that the command context corresponds to replaying a previously-played lyric of the song,
wherein the one or more song segment contexts comprise lyrics.

* * * * *